United States Patent
Wada et al.

(10) Patent No.: US 8,978,489 B2
(45) Date of Patent: Mar. 17, 2015

(54) COMBUSTION GAS BLEEDING PROBE AND METHOD FOR RUNNING PROBE

(75) Inventors: Hajime Wada, Kumagaya (JP); Shinichiro Saito, Kumagaya (JP)

(73) Assignee: Taiheiyo Cement Corporation, Tokyo (JP)

( * ) Notice: Subject to any disclaimer, the term of this patent is extended or adjusted under 35 U.S.C. 154(b) by 1069 days.

(21) Appl. No.: 12/922,524

(22) PCT Filed: Mar. 5, 2009

(86) PCT No.: PCT/JP2009/054148
§ 371 (c)(1),
(2), (4) Date: Nov. 3, 2010

(87) PCT Pub. No.: WO2009/113440
PCT Pub. Date: Sep. 17, 2009

(65) Prior Publication Data
US 2011/0041586 A1    Feb. 24, 2011

(30) Foreign Application Priority Data

Mar. 14, 2008    (JP) ................................. 2008-065667

(51) Int. Cl.
*G01N 1/22* (2006.01)
*C04B 7/60* (2006.01)
*F27D 17/00* (2006.01)
*F27D 21/00* (2006.01)
*G01N 7/00* (2006.01)

(52) U.S. Cl.
CPC ................ *C04B 7/60* (2013.01); *F27D 17/008* (2013.01); *F27D 21/00* (2013.01)
USPC ..................................... 73/863.11; 73/23.31

(58) Field of Classification Search
CPC ......... C04B 7/60; F27D 21/00; F27D 17/001; F27D 17/008; F27D 9/00; F27D 17/004; F27D 2009/0067; F27D 2009/0075; G01N 1/2247; G01N 2001/2264; G01N 1/2252; G01N 2001/2255; G01N 2001/2285; G01N 1/24; G01N 1/26; G01N 1/2258; F27B 7/38

USPC ............... 73/863.11, 863.81, 863.83, 863.84, 73/864.73, 23.31; 432/116, 77, 117, 82, 432/113, 173; 137/1, 897
See application file for complete search history.

(56) References Cited

U.S. PATENT DOCUMENTS 4,283,947 A * 8/1981 George et al. .............. 73/863.11
6,017,213 A * 1/2000 Murata et al. ................. 432/116

FOREIGN PATENT DOCUMENTS

JP        02116649 A    5/1990
JP        9301751 A    11/1997

(Continued)

*Primary Examiner* — Daniel S Larkin
*Assistant Examiner* — Jamar Ray
(74) *Attorney, Agent, or Firm* — Stetina Brunda Garred & Brucker

(57) ABSTRACT

Provided is a combustion gas bleeding probe, which is elongated in lifetime and improved in chlorine removing ability and so on. The combustion gas bleeding probe (1) comprises a cold gas discharge means having a plurality of discharge ports (2b) for discharging cold gases (C) substantially perpendicularly of the suction direction (S) of a combustion gas (G) and toward the center of the combustion gas flow. A vector (A), which is composed of momentum vectors (MVs) of the cold gas (C) discharged individually from the plural discharge ports, has a vertically downward component. This vertically downward component of the synthesized vector is made the larger, as the angle between the suction direction of the combustion gas and the flow direction of the combustion gas before sucked by the probe becomes the closer to a right angle. The vertically downward component of the synthesized vector is made the smaller, as the suction direction of the combustion gas and the flow direction of the combustion gas before sucked by the probe become the closer to parallel. Two to six discharge ports can be arranged in a plane normal to the sucking direction of the combustion gas by the probe.

14 Claims, 4 Drawing Sheets

(56) References Cited

FOREIGN PATENT DOCUMENTS

| | | | |
|---|---|---|---|
| JP | 11035355 A | 2/1999 | |
| JP | 2008056548 A | 3/2008 | |
| WO | WO0012444 | 3/2000 | |
| WO | 2005050114 A1 | 6/2005 | |

* cited by examiner (a)

(d)

(b)

(e)

(c)

COMBUSTION GAS BLEEDING PROBE AND METHOD FOR RUNNING PROBE

CROSS-REFERENCE TO RELATED APPLICATIONS

The present application claims priority to International Application No. PCT/JP2009/054148 filed on Mar. 5, 2009, which claims priority to Japanese Patent Application No. 2008-065667 filed on Mar. 14, 2008.

STATEMENT RE: FEDERALLY SPONSORED RESEARCH/DEVELOPMENT

Not Applicable

BACKGROUND OF THE INVENTION

1. Technical Field of the Invention

The present invention relates to a combustion gas bleeding probe and a method for running the probe, and more particularly to a combustion gas bleeding probe and a method for running the probe used for, for instance, a cement kiln chlorine bypass facility that bleeds a kiln exhaust gas passage running from an end of the cement kiln to a bottom cyclone, of a part of combustion gas to remove chlorine.

2. Description of the Related Art

It is noticed that chlorine, sulfur, alkali and the like cause troubles such as preheater clogging in cement manufacturing facility, and especially chlorine exerts the most harmful effect, so that a cement kiln chlorine bypass system that bleeds a section near an inlet hood of a part of combustion gas to remove chlorine is used. And, the quantity of chlorine carried into a cement kiln increases with the increase in the amount of practical use of chlorine-content recycled resources in recent years, so that augmenting capability of the chlorine bypass facility becomes inescapable.

In the chlorine bypass facility, in order to extract a part of combustion gas from a section near an entrance hood, a probe is mounted so as to protrude near the entrance hood and an extracted gas disposal equipment is installed in a rear stage of this probe. Since a head of the probe is exposed to a high temperature circumstance at approximately 1000□ near the entrance hood, steel casting with a high degree of heat resistance needs to be used for the head, or it is necessary to cool the head with a cooling air taken in from the outer side of the entrance hood to protect the probe.

Further, since volatile components such as chlorine in a kiln exhaust gas are condensed to a fine powder portion of bypass dust by carrying out rapid cooling to approximately 450° or less with the probe, a classification means such as a cyclone is arranged to a gas extraction and discharge equipment in the rear stage, and bypass dust is classified into coarse powder dust with low volatile component concentration and fine powder dust with high volatile component concentration, and the coarse powder dust is returned to a kiln system, and only fine powder dust is discharged out of the system through the chlorine bypass facility to reduce the quantity of the bypass dust. Therefore, it is required to carry out rapid cooling of the kiln exhaust gas in the probe from this point also.

From the above-mentioned point of view, in Patent document 1 is described a combustion gas bleeding probe comprising: an inner tube in which a hot gas flows; an outer tube surrounding the inner tube; cold gas discharge ports drilled in the inner tube; and a cold gas feeding means for feeing a cold gas between the inner tube and the outer tube and for discharging cold gases from the discharge ports in directions substantially perpendicularly of a suction direction of a hot combustion gas and toward the center of the combustion gas.

Patent document 1: International Patent Publication WO2005/050114 Pamphlet

However, although in case that a cross flow cooling type probe with high chlorine removing capability such as the combustion gas bleeding probe described in Patent document 1 is used, in accordance with a condition where the probe is installed, such as an angle of the probe installed, a combustion gas to be sucked and dust contained in the combustion gas unevenly flow in the probe or a secondary mixing cooler, which induces abrasion of the probe and uneven gas temperature distribution in the probe, causing short lifetime and deteriorated performance of the probe.

In addition, in order to prevent the abrasion of the probe and the uneven distribution of the gas temperature in the probe, abrasion prevention plates or uneven flow prevention plates were installed, but effects as expected could not been obtained.

The present invention has been made in consideration of the above-mentioned problems in conventional arts and the object thereof is to elongate lifetime of the combustion gas bleeding probe and improve performance such as chlorine removing ability thereof.

SUMMARY OF THE INVENTION

To achieve the above object, the present invention relates to a combustion gas bleeding probe comprising a cold gases discharge means having a plurality of discharge ports for discharging cold gases substantially perpendicularly of a suction direction of a combustion gas and toward a center of the combustion gas flow, and the probe is characterized in that a vector, which is composed of momentum vectors of the cold gas discharged individually from the plurality of discharge ports, has a vertically downward component.

With the present invention, the probe is constructed such that a vector, which is composed of momentum vectors of the cold gas discharged individually from the plurality of discharge ports, has a vertically downward component, so that a cold gas can be supplied in accordance with a degree of uneven flows of a combustion gas and dusts, which allows the uneven flow of the dusts and collision of the dusts to components of the probe to be suppressed to the minimum and also allows the uneven distribution of the gas temperature in the probe to be reduced, resulting in elongated lifetime and improved performance of the probe.

It is possible to construct the above combustion gas bleeding probe such that the vertically downward component of the synthesized vector is made the larger, as an angle between the suction direction of the combustion gas and the flow direction of the combustion gas before sucked by the probe become the closer to a right angle, and the vertically downward component of the synthesized vector is made the smaller, as the suction direction of the combustion gas and the flow direction of the combustion gas before sucked by the probe become the closer to parallel. Since the position of the gravity center of a velocity distribution of the combustion gas shifts the larger from the physical center of the probe, as the angle between the suction direction of the combustion gas and the flow direction of the combustion gas before sucked by the probe becomes the closer to a right angle, positions of the discharge ports can appropriately be adjusted in accordance with a magnitude of the shift in gravity center.

In the above combustion gas bleeding probe, the discharge ports can be arranged at two to six spots in a plane normal to the sucking direction of the combustion gas by the probe, and 10% or more to 50% or less of cold gas of total cold gas amount is discharged from each discharge port. With this, cold gases are evenly discharged to the overall area of the probe, which effectively reduces the uneven distribution of gas temperature in the probe and so on. In this connection, the position of each discharge port can be determined through simulation of cooling condition of the combustion gas (temperature distribution in the probe), and the quantity of cold gas discharged from each discharge port is preferably be adjusted from measurement results of the temperature distribution.

In the combustion gas bleeding probe described above, the discharge ports may be arranged at two spots in a plane normal to the sucking direction of the combustion gas by the probe, and each of the discharge ports arranged at two spots can be arranged at a position shifted toward the gravity center of the velocity distribution of the combustion gas from the physical center of the probe. In addition, in this combustion gas bleeding probe, a maximum displacement of each discharge port may be 30% of the inner diameter of the probe. When a displacement more than 30% of the inner diameter is given, from viewpoint of the physical center of the probe, the amount of cold gas to a direction opposite to a direction of gravity center of the velocity distribution of the combustion gas may be insufficient, it is preferable to determine the optimum value of the displacement in relation to setting of outlet temperatures of the probe through simulation and others.

Further, the present invention relates to a method for running each of the above-mentioned combustion gas bleeding probes, and the method is characterized by comprising the steps of: measuring temperature distribution in the probe after discharging the cold gas, and discharging more cold gas from the discharge port whose surrounding temperature is the highest. With this, the amount of cold gas from the discharge port can be adjusted in accordance with the temperature near the discharge port, which allows uneven distributions of gas temperature in the probe to effectively be suppressed.

In the above method for the running combustion gas bleeding probe, discharging velocity of the cold gas discharged from each of the discharge ports may be adjusted 5 m/s or more to 100 m/s or less. When the discharging velocity is below 5 m/s, the cold gas discharged does not reach a central portion of the probe, which cannot effectively suppress uneven distributions of gas temperature in the probe and the like, and when the discharging velocity exceeds 100 m/s, there is undesirably a fear of disturbing smooth suction of the combustion gas through the probe.

As described above, with the present invention, it is possible to provide a combustion gas bleeding probe, and a method for running the probe realizing elongated lifetime of the probe and improved performance such as chlorine removing ability thereof.

BRIEF DESCRIPTION OF THE DRAWINGS

The present invention will be more apparent from the ensuring description with reference to the drawings, wherein.

DETAILED DESCRIPTION OF THE INVENTION

Figure 1:
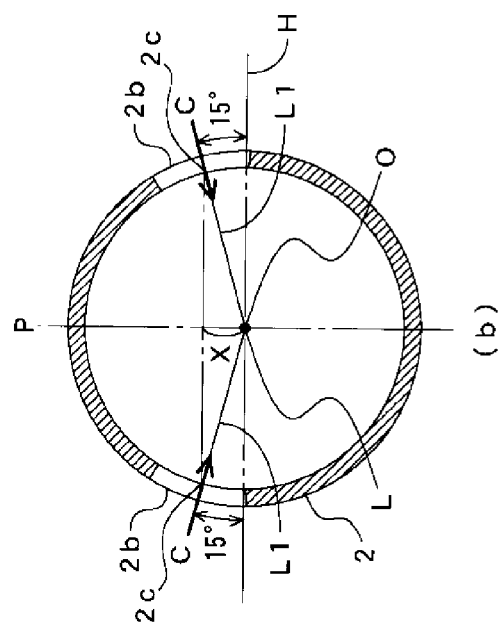
FIG. 1 is a partially fragmented cross-sectional view showing a combustion gas bleeding probe according to an embodiment of the present invention.
Figure 1:
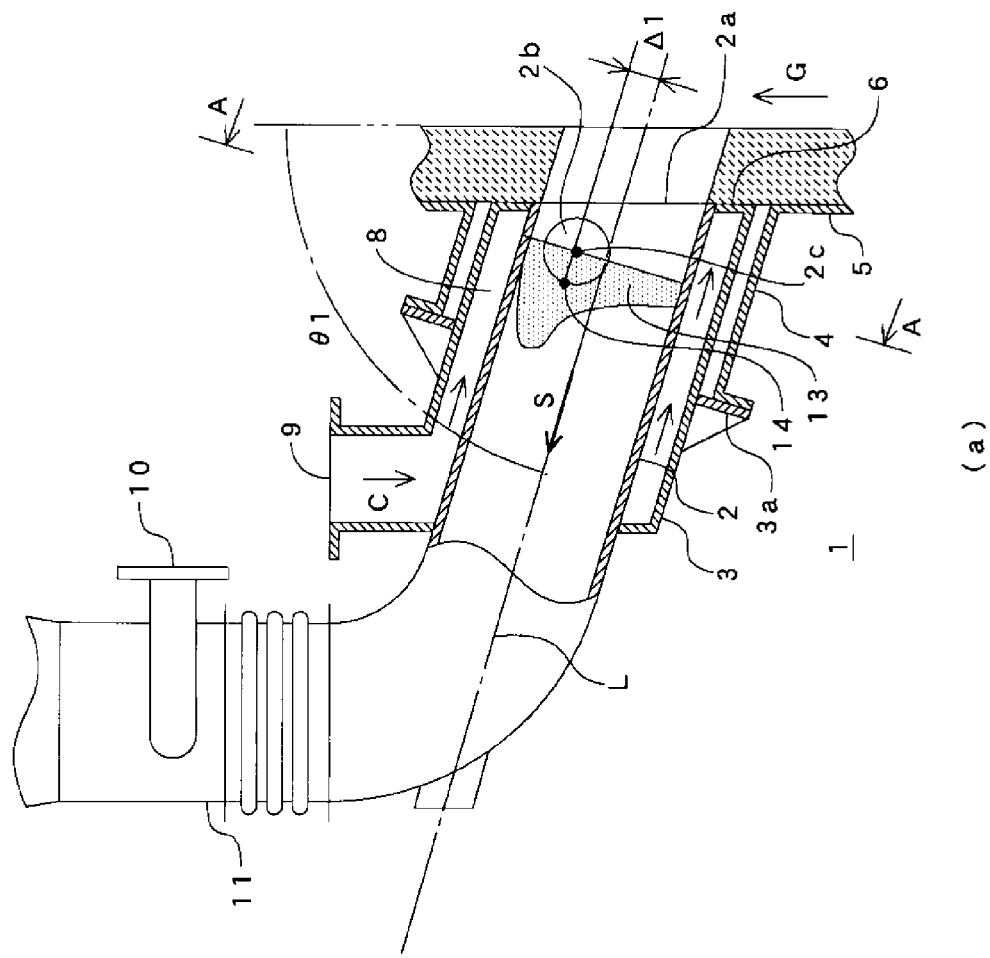

Next, embodiments of the present invention will be explained with reference to drawings.

FIG. 1(a) shows a combustion gas bleeding probe (hereinafter abbreviated as "probe") according to an embodiment of the present invention, and this probe 1 is provided with a cylindrical inner tube 2; a cylindrical outer tube 3 surrounding the inner tube 2; a ring-shaped end plate 6, fixed to an end of the outer tube 3, as a plate member; a cooling air passage 8 formed between the inner tube 2 and the outer tube 3; a primary cooling air feed port 9 for feeding a primary cooling air from a cooling fan (not shown) to the cooling air passage 8; and so on, and the probe 1 is installed on a rising part 5 of a cement kiln via a mounting seat 4. To a duct 11 downstream of the probe 1 is mounted a secondary cooling air feeding port 10 for cooling to uniform temperature.

The inner tube 2 is mounted to suck a high temperature combustion gas G flowing at the rising part 5 in a direction of the arrow S while cooling it with primary cooling airs (hereinafter referred to as "cooling airs") C introduced from discharge ports 2b. An inlet portion 2a of the inner tube 2 faces a combustion gas flow passage of the rising part 5 of the cement kiln. The discharge ports 2b are mounted two in number at spots in line symmetry with respect to a vertical line P passing through the center O of the inner tube 2 as an axis of symmetry.

The outer tube 3 is cylindrically formed, and a section thereof is a circle which is concentric with the inner tube 2 so as to surround the inner tube 2. The outer tube 3 is fixed to the mounting seat 4 through a flange portion 3a. Between an inner face of the outer tube 3 and an outer face of the inner tube 2 is formed the cooling air passage 8, and to the cooling air passage 8 is fed a cooling air C from the primary cooling air feed port (hereinafter referred to as "feed port") 9, and the cooling air C is introduced into the inside of the inner tube 2 through the discharge ports 2b.

Next, positions where the discharge ports 2b are mounted, which characterizes the present invention, will be explained with reference to FIG. 1(b). FIG. 1(b) is a view of the probe 1 observed from A-A, and is illustrated in such a manner that an axial line L in FIG. 1(a) is normal to the paper surface where FIG. 1(b) is drawn.

As shown in FIG. 1(b), the discharge ports 2b are arranged one by one, right and left such that the angle between a straight line L1 connecting the center 2c of the discharge port 2b and the center O of the inner tube 2 and a horizontal line H passing though the center O of the inner tube 2 becomes 15°. The reason why such arrangement is adopted will be described below.

Figure 2:
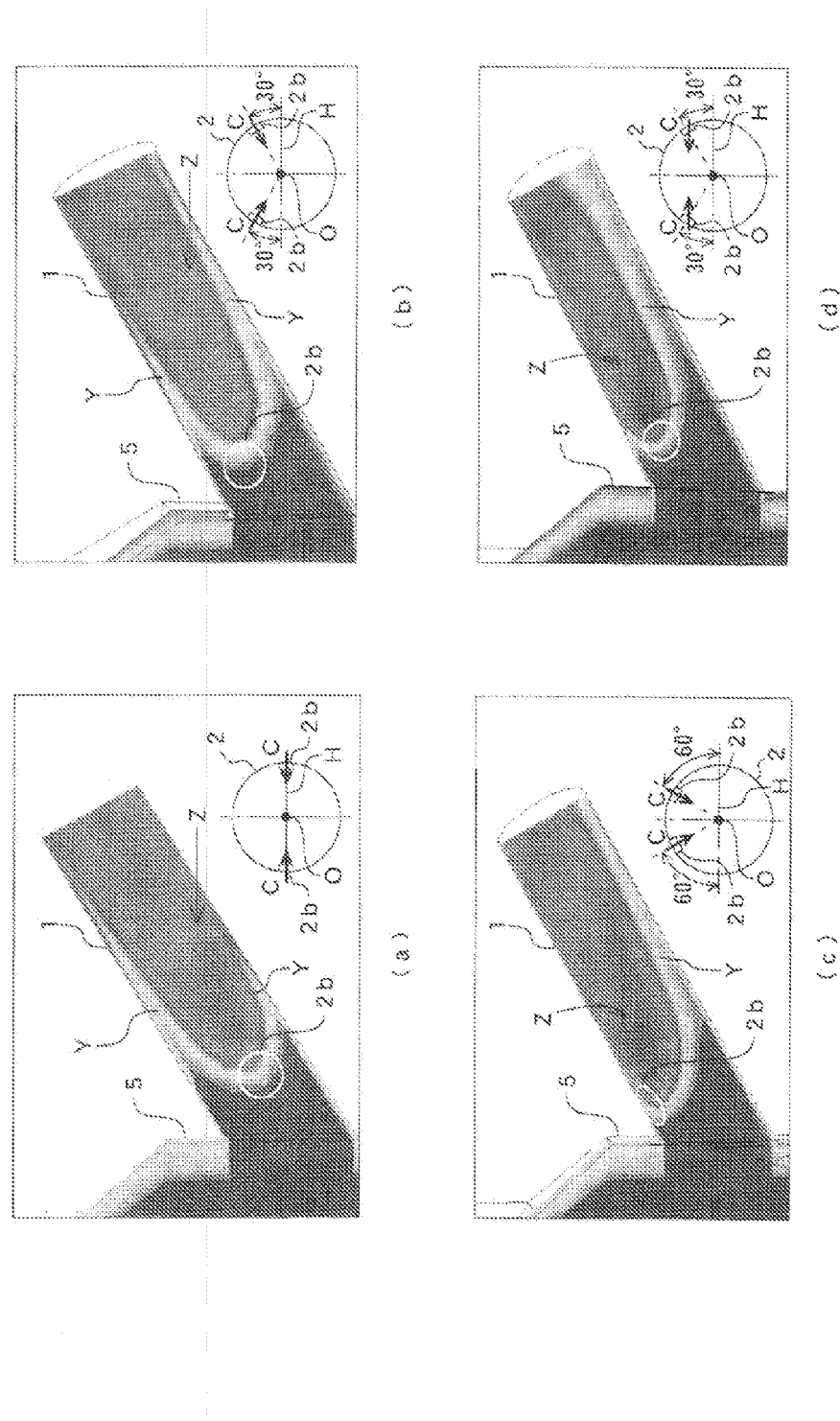
FIG. 2 is a drawing showing simulation results of temperature distribution in the combustion gas bleeding probe.

FIG. 2 shows results of simulation of inner temperature distribution of the above probe 1. In the figure, (a) shows a case that as a blank test, the centers of the discharge ports 2b for the cooling airs C are arranged one by one, left and right on the horizontal line H passing through the center O of the inner tube 2, and the cooling airs C are discharged toward the center O of the inner tube 2; (b) shows a case that the discharge ports 2b are arranged one by one, left and right such that the angle between a straight line connecting the center of the discharge port 2b for the cooling air C and the center O of the inner tube 2 and a horizontal line H passing though the center O of the inner tube 2 becomes 30°, and the cooling airs C are discharged toward the center O of the inner tube 2; (c)

shows a case that the discharge ports 2b are arranged one by one, left and right such that the angle between a straight line connecting the center of the discharge port 2b for the cooling air C and the center O of the inner tube 2 and a horizontal line H passing though the center O of the inner tube 2 becomes 60°, and the cooling airs C are discharged toward the center O of the inner tube 2; and (d) shows a case that the discharge ports 2b are arranged one by one, left and right such that the angle between a straight line connecting the center of the discharge port 2b for the cooling air C and the center O of the inner tube 2 and a horizontal line H passing though the center O of the inner tube 2 becomes 30°, and the cooling airs C are discharged in a horizontal direction.

In FIGS. 2(a) to 2(d), black portions in the rising part 5 and in the probe 1 near the rising part 5 are high temperature portions (approximately 1100□); light color portions Y adjacent to the high temperature portions are portions whose temperature (approximately 600° is lower than the black portions; and patterned portions Z in the probe 1 are low temperature portions (approximately 400-600□), and temperature of the low temperature portion is the lower in temperature as the color thereof is the darker.

In the blank test shown in FIG. 2(a), a light color portion Y strongly appears at an upper portion of the probe 1 and a light color portion Y weakly appears at a lower portion of the probe 1, so that it is proved that cooling of the combustion gas G at the upper portion of the probe 1 is insufficient. In addition, plurality of different color patterns appear in the patterned portion Z, which shows that gas temperatures in the probe 1 are unevenly distributed.

Next, in case of FIG. 2(b), a light color portion Y strongly appears at a lower portion of the probe 1, and a light color portion Y weakly appears at an upper portion of the probe 1, so that it is proved that cooling of the combustion gas at the lower portion of the probe 1 is insufficient. But, even though a patterned portion Z appears, only a single patterned portion is shown, which proves that gas temperatures in the probe 1 are slightly unevenly distributed. From the above results, it is estimated that arranging the discharge ports 2b one by one, left and right at an intermediate position between the positions shown in FIGS. 2(a) and 2(b), that is, positions where the angle between a straight line connecting the center of the discharge port 2b for the cooling air C and the center O of the inner tube 2 and a horizontal line H passing though the center O of the inner tube 2 becomes 15° leads to a preferable result.

Next, in case of FIG. 2(c), a light color portion Y strongly appears at a lower portion of the probe 1, and no light color portion Y appears at an upper portion of the probe 1, so that it is proved that cooling of the combustion gas at the lower portion of the probe 1 is definitely insufficient. In addition, the area of a patterned portion Z is wide, and plurality of different color patterns appear, especially a dark portion exists at a central portion, which shows that gas temperatures are strongly unevenly distributed in the probe 1.

Next, in case of FIG. 2(d) also, a light color portion Y strongly appears at a lower portion of the probe 1, and no light color portion Y appears at an upper portion of the probe 1, so that it is proved that cooling of the combustion gas at the lower portion of the probe 1 is definitely insufficient. In addition, although the area of a patterned portion Z is narrow, but plurality of different color patterns appear, and especially a dark portion exists at a central portion, which shows that gas temperatures are strongly unevenly distributed in the probe 1. Comparing this result and the result shown in FIG. 2(b) shows that even if the positions of the discharge ports 2b are adjusted, unless the cooling airs C are discharged toward the center O of the inner tube 2 shown in FIG. 1, a preferable result would not be obtained.

From the result of the above simulation, it is proved that when the probe 1 shown in FIG. 1 is used, arranging each of the discharge ports 2b such that the angle between the straight line connecting the center of the discharge port 2b for the cooling air C and the center O of the inner tube 2 and the horizontal line H passing though the center O of the inner tube 2 becomes 15° as well as discharging the cooling airs C from the discharge ports 2b toward the center O of the inner tube 2 leads to a preferable result. This is because, as shown in FIG. 1, observing a velocity distribution 13 of the sucked gas in the probe 1, high velocity portions gather on the upper side, and the gravity center 14 of the velocity distribution 13 exists above the physical center, which exists on the axial line L, it is estimated that in accordance with this, arranging the discharge ports 2b for discharging the cooling airs C also above the physical center of the probe 1 achieves a preferable result.

Next, the relation between a mounting angle of the probe 1 to the rising part 5 and mounting positions of the discharge ports 2b will be explained with reference to FIGS. 1 and 3.

Figure 3:
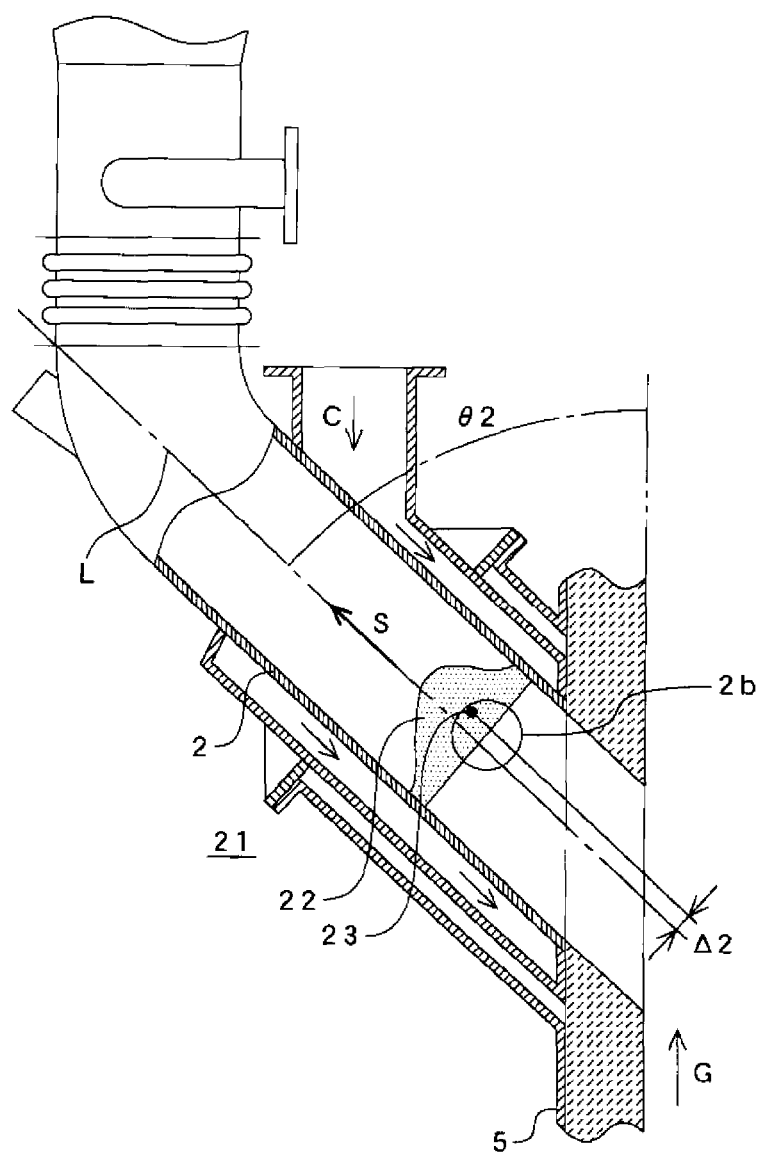
FIG. 3 is a partially fragmented cross-sectional view showing a combustion gas bleeding probe according to another embodiment of the present invention.
Figure 4:
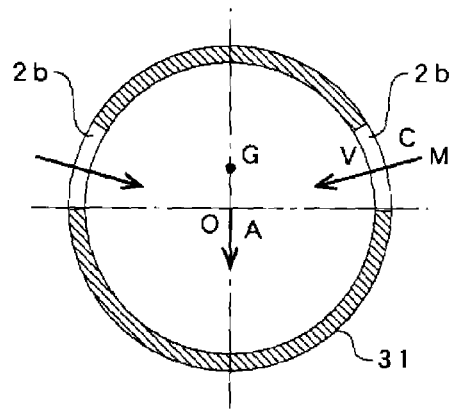
FIG. 4 is a diagrammatical view for explaining examples of arrangements of discharge ports of the combustion gas bleeding probe according to the present invention.
Figure 4:
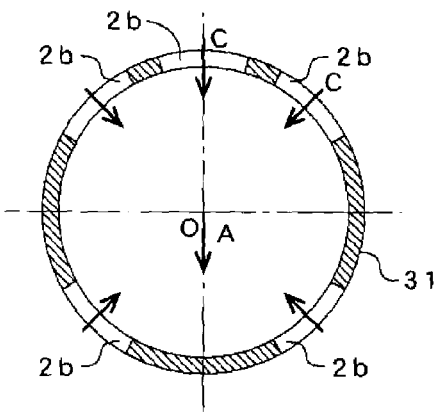
Figure 4:
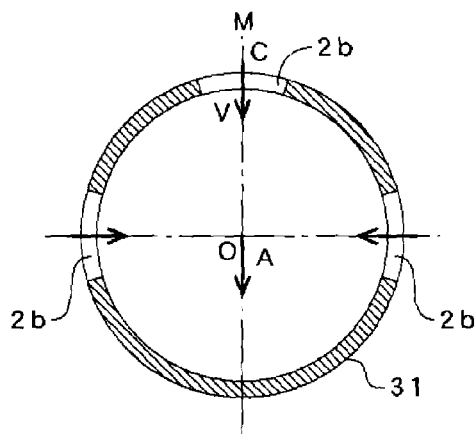
Figure 4:
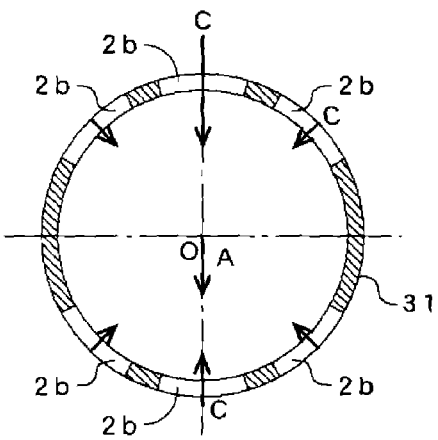
Figure 4:
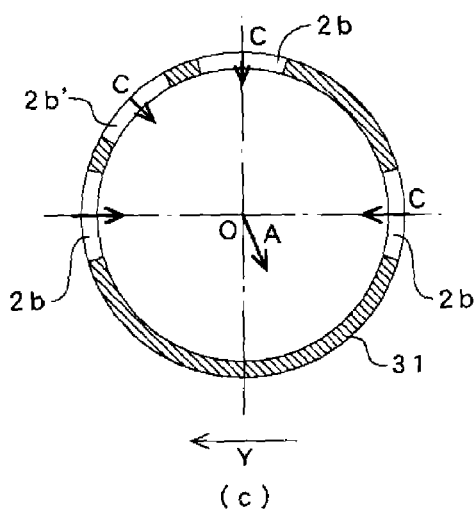

FIG. 3 shows a case that a probe 21 with the same construction as the probe 1 shown in FIG. 1 is mounted such that an angle θ2 against a surface of the rising part 5 becomes smaller than θ1 in FIG. 1. Below, detailed explanation on constituents of the probe 21 will be omitted.

In the probe 21, as the angle θ2 between the axial line L of the probe 21 and the surface of the rising part 5, that is, the relation of the axial line L and a direction of the flow of the combustion gas G before sucked by the probe 21 approaches to be in parallel than that in FIG. 1, a degree of uneven flow of the sucked gas in the probe 21 becomes smaller, and the amount of an upward shift Δ2 from the physical center of the probe 21, which exists on the axial line L, becomes smaller than the amount of an upward shift Δ1 of the probe 1 shown in FIG. 1. Therefore, in consideration of the amount of the shift of the gravity center 23, in the probe 21, in comparison to the case of the probe 1, the discharge ports 2b are arranged so as to approach the physical center of the probe 1.

Meanwhile, as described above, although the mounting positions of the discharge ports 2b should be changed in accordance with the mounting angles θ1, θ2 against the rising parts 5 of the probes 1, 21, when a displacement X (See FIG. 1(b)) of the mounting position of the discharge ports 2b from the physical centers of the probes 1, 21 exceed 30% of the inner diameters of the probes 1, 21, observed from the physical centers of the probes 1, 21, the amount of the cooling air C to a direction opposite to directions to the gravity center 14, 23 of the velocity distributions 13, 22 of the combustion gas G may be insufficient, so that optimum positions of the discharge ports 2b are preferably determined through simulation while changing setting value of outlet temperatures of the probes 1, 21.

In the above embodiment, the discharge ports 2b are disposed at two spots in a plane normal to the sucking directions of the combustion gas by the probes 1, 21, the discharge ports 2b can be disposed at more or equal to three spots. Examples of arrangements in such cases will be explained with reference to FIG. 4. FIGS. 4(a) to 4(e) show are examples that the discharge ports 2b are disposed at two to six spots, each figure shows a cross section normal to the sucking direction of the combustion gas by the probe 31.

FIG. 4(a) shows an example that the discharge ports are arranged at two spots, in this case, as described above, the discharge ports 2b are disposed at positions shifted from the physical center O of the probe 31 toward the gravity center G of the velocity distribution of the combustion gas. Here, the cooling airs C are discharged from the discharge ports 2b toward the physical center O of the probe 31, so that when the cooling air C of mass M is discharged from each of the discharge ports 2b at a velocity V, momentum vectors MVs have magnitudes and directions shown in the figure. Then, synthesizing the two momentum vectors MVs produces a vector A, the direction of the vector A becomes vertically downward. Therefore, when the discharge ports 2b are disposed at two spots, shifting the discharge ports 2b from the physical center O of the probe 31 toward the gravity center G of the velocity distribution of the combustion gas, in other words, corresponds to making the direction of the synthesized vector A of the momentum vectors MVs of the cooling airs C discharged from the discharge ports 2b vertically downward.

FIG. 4(b) shows an example that the discharge ports are arranged at three spots, in this case, two discharge ports 2b are disposed on the same level as the physical center O of the probe 31 and one discharge port 2b is arranged on a ceiling portion. Here, when the cooling air C of mass M is discharged from each of the discharge ports 2b at a velocity V, momentum vectors MVs have magnitudes and directions shown in the figure. Then, synthesizing the three momentum vectors MVs produces a vector A, the direction of the vector A also becomes vertically downward.

FIGS. 4(c) to 4(e) show examples that the discharge ports are arranged at four to six spots. The direction of the vector A obtained by synthesizing momentum vectors, which are shown by arrows at discharge ports 2b of the cooling airs C discharged from the discharge ports 2b become vertically downward in FIGS. 4(d) and 4(e). On the other hand, FIG. 4(c) shows an example that the discharge ports are arranged at four spots. In this case, the amount of combustion gas on a back side (the direction of the arrow Y) of a cement kiln is much, so that a discharge port 2b' is disposed on the back side. Therefore, the direction of a vector A obtained by synthesizing momentum vectors of the cooling airs C discharged from the discharge ports 2b, 2b' does not become vertically downward but becomes lower right, and the vector A has a vertically downward component.

As described above, this invention is, regardless of the number of discharge ports 2b including the discharge ports 2b' arranged, characterized in that the vector A obtained by synthesizing momentum vectors of the cooling airs C discharged from the discharge ports 2b has a vertically downward component. In this connection, the amounts of the cooling airs C each discharged from the discharge ports 2b are not required to be the same, and the cooling airs C each are not required to be discharged at the same velocity. In either case, as long as a vector obtained by synthesizing momentum vectors of the cooling airs discharged from the discharge ports has a vertically downward component, the same effect can be obtained.

Next, the relation between the mounting angle of the probe, that is, the angle between the suction direction of the combustion gas and the flow direction of the combustion gas before sucked, and the mounting positions of the discharge ports will be explained.

In FIGS. 1 and 3, the relation between the mounting angle of the probe 1 to the rising part 5 when the discharge ports 2b are disposed at two spots and the mounting positions of the discharge ports 2b will be explained, and in FIG. 3, as the relation of the sucking direction S of a combustion gas and the flow direction of the combustion gas G before sucked by the probe 21 becomes closer to parallel in comparison to FIG. 1, the amount of the upward shift Δ2 of the gravity center 23 of the velocity distribution 22 of the sucked gas in the probe 21 from the physical center of the probe 21 becomes smaller than the amount of the upward shift Δ1 of the probe 1 shown in FIG. 1, so that in consideration of the amount of the shift, in the probe 21, the discharge ports 2b are arranged so as to be nearer to the physical center of the probe 1 in comparison to the case of probe 1. In other words, in FIG. 3, this corresponds to making a vertically downward component of a synthesized vector of momentum vectors of the cooling airs discharged from the discharge ports 2b small. When the discharge ports 2b are arranged at more or equal to three spots, in the same manner, it is necessary to make the vertically downward component of the synthesized vector of the momentum vectors of the cooling airs C smaller as the suction direction of the combustion gas and the flow direction of the combustion gas before sucked by the probe become the closer to parallel.

When running the probes 1, 21, 31, it is preferable to measure temperature distribution in each probe after discharging the cooling airs C, and to control the quantity of the cooling air fed from each of the discharge ports 2b in accordance with the measured temperature. For example, from the discharge port 2b whose ambient temperature is the highest is discharged much cooling air C. The velocity of the cooling airs C discharged from the discharge ports 2b is set to be higher or equal to 5 m/s so at to reach central portions of the inner tubes of the probes 1, 21, 31, and since excessive increase of the velocity may prevent smooth suction of the combustion gas, the velocity is adjusted to be lower or equal to 100 m/s.

Further, although in the above embodiments are explained cases where high temperature combustion gas G is cooled with airs taken from areas surrounding the probes 1, 21, 31, it is possible to use ventilated air containing bad smell, which is generated when drying wastes such as municipal solid waste incineration ash, sewage sludge and construction generating soil in cement burning facilities and so on as gases for cooling.

EXPLANATION OF REFERENCE NUMBERS 1 probe
2 inner tube
2a inlet portion
2b (2b') discharge port
2c center (of the discharge port)
3 outer tube
3a flange portion
4 mounting seat
5 rising part
6 end plate
8 cooling air passage
9 primary cooling air feed port
10 secondary cooling air feed port
11 duct
13 velocity distribution (of sucked gas)
14 gravity center of the velocity distribution
21 probe
22 velocity distribution (of sucked gas)
23 gravity center of the velocity distribution
31 probe

The invention claimed is:
1. A combustion gas bleeding probe comprising a tube having an inner passageway for a combustion gas flow, the tube having a plurality of discharge ports in direct fluid communication with the inner passageway for discharging cooling gases into the inner passageway substantially perpendicularly to a suction direction of a combustion gas and toward a center of the combustion gas flow, wherein a cooling gas synthesized vector, which is a summation of momentum vectors of all the cooling gas discharged into the inner passageway, has a vertically downward component.

2. The combustion gas bleeding probe as claimed in claim 1, wherein said vertically downward component of the synthesized vector increases as an angle between the suction direction of the combustion gas and the flow direction of the combustion gas before sucked into said probe becomes the closer to a right angle, and said vertically downward component of the synthesized vector decreases as the suction direction of the combustion gas and the flow direction of the combustion gas before sucked into said probe become the closer to parallel.

3. The combustion gas bleeding probe as claimed in claim 2, wherein said discharge ports are arranged at two to six spots in a plane normal to the sucking direction of the combustion gas by said probe, and 10% or more to 50% or less of cooling gas collectively emitted by the plurality of discharge ports discharged from each discharge port.

4. The combustion gas bleeding probe as claimed in claim 2, wherein said discharge ports are arranged at two spots in a plane normal to the sucking direction of the combustion gas by said probe, and each of said discharge ports arranged at two spots is arranged at a position shifted toward a gravity center of a velocity distribution of the combustion gas from a physical center of said probe.

5. The combustion gas bleeding probe as claimed in claim 2, wherein a maximum displacement of an axis passing through the center of each discharge port from a center point of the probe is 30% of an inner diameter of said probe.

6. The combustion gas bleeding probe as claimed in claim 1, wherein said discharge ports are arranged at two to six spots in a plane normal to the sucking direction of the combustion gas by said probe, and 10% or more to 50% or less of cooling gas collectively emitted by the plurality of discharge ports is discharged from each discharge port.

7. The combustion gas bleeding probe as claimed in claim 6, wherein said discharge ports are arranged at two spots in a plane normal to the sucking direction of the combustion gas by said probe, and each of said discharge ports arranged at two spots is arranged at a position shifted toward a gravity center of a velocity distribution of the combustion gas from a physical center of said probe.

8. The combustion gas bleeding probe as claimed in claim 6, wherein a maximum displacement of an axis passing through the center of each discharge port from a center point of the probe is 30% of an inner diameter of said probe.

9. The combustion gas bleeding probe as claimed in claim 1, wherein said discharge ports are arranged at two spots in a plane normal to the sucking direction of the combustion gas by said probe, and each of said discharge ports arranged at two spots is arranged at a position shifted toward a gravity center of a velocity distribution of the combustion gas from a physical center of said probe.

10. The combustion gas bleeding probe as claimed in claim 9, wherein a maximum displacement of an axis passing through the center of each discharge port from a center point of the probe is 30% of an inner diameter of said probe.

11. The combustion gas bleeding probe as claimed claim 1, wherein a maximum displacement of an axis passing through the center of each discharge port from a center point of the probe is 30% of an inner diameter of said probe.

12. A method for running the combustion gas bleeding probe claimed in one of claims 1 to 11, comprising the steps of:
measuring temperature distribution in said probe after discharging the cooling gas, and
discharging more cooling gas from the discharge port whose surrounding temperature is the highest.

13. The method for running the combustion gas bleeding probe as claimed in claim 12, further comprising a step of adjusting a discharging velocity of the cooling gas discharged from each of said discharge ports 5 m/s or more to 100 m/s or less.

14. A combustion gas bleeding probe comprising a tube having an inner passageway for a combustion gas flow, the tube having a plurality of discharge ports in direct fluid communication with the inner passageway for discharging cooling gases into the inner passageway substantially perpendicularly to a suction direction of a combustion gas and toward a center of the combustion gas flow, wherein a synthesized vector, which is a summation of momentum vectors of the cooling gas discharged individually from the plurality of discharge ports, has a vertically downward component, wherein a maximum displacement of an axis passing through the center of each discharge port from a center point of the probe is 30% of an inner diameter of said probe.

* * * * *